United States Patent [19]

Aldissi

[11] Patent Number: 4,554,093

[45] Date of Patent: Nov. 19, 1985

[54] ELECTRICALLY CONDUCTIVE DOPED BLOCK COPOLYMER OF POLYACETYLENE AND POLYISOPRENE

[75] Inventor: Mahmoud Aldissi, Los Alamos, N. Mex.

[73] Assignee: The United States of America as represented by the Department of Energy, Washington, D.C.

[21] Appl. No.: 625,323

[22] Filed: Jun. 27, 1984

[51] Int. Cl.$^4$ ............................................... H01B 1/00
[52] U.S. Cl. ..................................... 252/500; 524/80; 525/275
[58] Field of Search ................ 252/500; 525/275, 356; 524/80

[56] References Cited

U.S. PATENT DOCUMENTS 4,394,304  7/1983  Wnek .................................. 252/500
4,510,075  4/1985  Lee et al. ............................. 252/500
4,510,076  4/1985  Lee et al. ............................. 252/500

*Primary Examiner*—Josephine L. Barr
*Attorney, Agent, or Firm*—William A. Eklund; Paul D. Gaetjens; Judson R. Hightower

[57] ABSTRACT

An electrically conductive block copolymer of polyisoprene and polyacetylene and a method of making the same are disclosed. The polymer is prepared by first polymerizing isoprene with n-butyllithium in a toluene solution to form an active isoprenyllithium polymer. The active polymer is reacted with an equimolar amount of titanium butoxide and subsequently exposed to gaseous acetylene. A block copolymer of polyisoprene and polyacetylene is formed. The copolymer is soluble in common solvents and may be doped with $I_2$ to give it an electrical conductivity in the metallic regime.

4 Claims, No Drawings

ELECTRICALLY CONDUCTIVE DOPED BLOCK COPOLYMER OF POLYACETYLENE AND POLYISOPRENE

This invention is the result of a contract with the U.S. Department of Energy (Contract No. W-7405-ENG-36).

BACKGROUND OF THE INVENTION

The invention described herein is generally related to electrically conductive polymeric materials. More specifically, this invention is related to the polyacetylene class of electrically conductive polymers.

Doped polyacetylene has now been studied for a number of years because of its electrical conductivity. One well-recognized difficulty in the practical application of polyacetylene is its insolubility in common organic solvents, which severely limits its processability in commercial applications. Accordingly, it has been sought to render polyacetylene soluble without reducing its capacity for being doped to render it electrically conductive.

Block copolymers of polyacetylene and polyisoprene have recently been reported by F. S. Bates and G. L. Baker in their paper entitled "Soluble Polyacetylene Graft Copolymers", published in Macromolecules, Volume 16, No. 4, pp. 704–707 (1983). The graft, or block, copolymers reported therein include polyisoprene polymers having a molecular weight of approximately 200,000. There is no discussion by Bates and Baker of any attempt to dope the copolymers in an attempt to obtain an electrically conductive polymer.

Accordingly, it is an object and purpose of the present invention to provide an electrically conductive polymer.

It is also an object of the invention to provide a dopable polymer which is soluble in common organic solvents and which is thereby processable.

SUMMARY OF THE INVENTION

The foregoing objects are attained by the present invention, which consists of a doped block copolymer of polyisoprene and polyacetylene, together with a method for making the same. The applicant has discovered that, through the use of a polyisoprene polymer which is shorter than has been previously reported in connection with block copolymers of polyacetylene, a block copolymer of polyacetylene and polyisoprene can be formed which can be doped to obtain an electrical conductivity in the metallic regime. In accordance with the method of the invention, in a first step there is formed an active polyisoprene polymer. This is accomplished by catalytic polymerization of monomeric isoprene, using as a catalyst n-butyllithium in toluene. The relative amounts of n-butyllithium and isoprene are preferably selected so as to give a polyisoprenyllithium polymer having a molecular weight of not greater than approximately 10,075; and more preferably between 10,075 and 7,000. The active polyisoprenyllithium is then reacted with an equimolar amount of tetrabutoxytitanium to give a polyisoprenyl-butoxide titanium (III) polymeric catalyst. This catalyst is exposed while still in solution to gaseous acetylene, whereupon spontaneous polymerization of the acetylene onto the polyisoprene carrier chain proceeds to form the block copolymer. The resulting block copolymer is characterized by being soluble in common organic solvents. The polymer may be preferably separated from solution as a freestanding film, and may be doped by exposure to iodine vapor to give it an electrical conductivity in the metallic regime.

These and other aspects of the present invention will be apparent upon consideration of the following detailed description of the invention.

DETAILED DESCRIPTION OF THE INVENTION

In accordance with the method of the invention, in the first step monomeric isoprene is polymerized using as a catalyst n-butyllithium in a solution of toluene. Polymerization is by anionic catalysis and produces an active isoprenyllithium polymer. The reaction is conducted under vacuum at room temperature. Preferably the reaction conditions are selected so as to obtain a polyisoprene carrier chain having a molecular weight of approximately 10,000. In this regard, the length of the polyisoprene polymer produced is largely a function of the ratio of the concentration of the isoprene to the concentration of the catalyst, n-butyllithium. With a ratio of approximately 100/1, polyisoprene chain lengths on the order of 100–150 monomer units, having a molecular weight of approximately 10,000 are obtained. The polymerization of the isoprene may be monitored by UV spectroscopy, since the monomer absorbs at 250–260 nanometers (nm) and the polymer chains absorb at 300–330 nm. The polymerization is preferably allowed to go to completion over a period of several days, or until the monomer absorption band disappears.

Upon completion of the isoprene polymerization process an equimolar amount of tetrabutoxytitanium (Ti(OBu)$_4$) is added to the solution to react with the active isoprenyllithium polymer and form a polymeric catalyst for the subsequent acetylene polymerization. In this reaction one of the butoxide ligands of the Ti(OBu)$_4$ is replaced with the isoprene polymer, and by aging the catalyst solution at room temperature the titanium is reduced from the +4 state to the +3 state. The reaction is allowed to proceed over several days, during which several color changes are observed. The reaction can be monitored by UV spectroscopy, with an absorption band being observed to develop at 500 nm over a period of approximately 48 hours.

Gaseous acetylene is then introduced into the reaction mixture at room temperature, whereupon polymerization proceeds spontaneously. The reaction is indicated by the formation of a dark blue solution, which is characteristic of the trans-rich polyacetylene sequences in the copolymer. The reaction is allowed to proceed until the absorption band at 500 nm disappears. A large band is observed in the UV-visible region (500–700 nm) due to the conjugated backbone of the polyacetylene sequences in the copolymer. The disappearance of the band at 500 nm is indicative of the total consumption of the polymeric catalyst leading to a 100% yield for the reaction. This is one advantage over the use of a Ziegler-Natta catalyst.

The block copolymer is separated from the solution as a freestanding film and doped by exposure to iodine vapor under vacuum at room temperature for 4–5 hours. The molecular weights of the polymer components of the polyisoprene/polyacetylene copolymer can be determined using gel permeation chromatography. The copolymer chains are almost monodisperse (I = $\overline{M}_w/\overline{M}_n$ = 1.15–1.20). The molecular weights of the polyacetylene sequences is measured by the difference between the molecular weight of the copolymer and the molecular weight of the polyisoprene before the copolymerization reaction. The molecular weights of the polyacetylene depends on the molecular weight of the polyisoprene carrier chain, and ranges from approximately 1,500 to 1,900 when the latter ranges from 7,000 to 10,000.

Protonic NMR and IR studies have shown that the polyisoprene microstructure consists of 60% of the 1,4-cis specie, 30% of the 1,4-trans specie, and 10% of the 3,4 specie. The polyacetylene sequences consist of 88% of the trans and 12% of the cis species. The latter can be completely transformed to the trans species by heating the polymer under vacuum at 90° C. for a few minutes.

The copolymer is soluble in common organic solvents, including benzene, toluene, tetrahydrofuran and chloroform. It will be recognized that this solubility, which is not generally a characteristic of other conductive polyacetylene polymers, renders the polymer processable, a characteristic which is important to the commercial development and application of conductive polymers.

EXAMPLE 1

50 milliliters of a solution of 0.02 mole/liter of n-butyllithium in toluene was prepared. Monomeric isoprene was added to this solution up to a concentration of 2 mole/liter. Under these conditions after five days a polymer having on the order of 148 monomer units, or a molecular weight of approximately 10,075, was formed. An equimolar amount (0.02 mole/l) of tetrabutoxytitanium was then added to the polymer solution to give a dark green intermediate polyisoprenyl-titanium (III) butoxide complex. This reaction takes 2–3 hours, although two days were allowed for the reaction to go to completion. Gaseous acetylene was then added in excess and allowed to react for approximately 24 hours by a Ziegler-Natta process to form a blue-purple block copolymer of polyisoprene and polyacetylene. Polymerization of the acetylene onto the polyisoprene proceeds by insertion addition and is self-limiting as to the length of the resulting polyacetylene polymer. The chain length of the polyacetylene was approximately 73 monomeric acetylene units, with a corresponding molecular weight of approximately 1,910.

The toluene solvent was removed by evaporation to give a homogenous film of the copolymer. The copolymer was doped with $I_2$ to give a polymer having a conductivity of between 1 and 10 $(ohm-cm)^{-1}$.

EXAMPLE 2

Polyisoprenyllithium was prepared as described above, however with the monomer isoprene concentration decreased so as to result in a polyisoprene molecular weight of approximately 7,900. Acetylene was polymerized onto the polyisoprene carrier chain in the same manner described above, and the resulting block copolymer was doped with iodine. The resulting polymer had a measured conductivity of 15 to 20 $(ohm-cm)^{-1}$.

EXAMPLE 3

Polyisoprenyllithium was prepared as above, however with the isoprene concentration further decreased to give a polyisoprene molecular weight of approximately 7,000. To this was grafted polyacetylene, which was determined to have a molecular weight of approximately 1,600. The resulting block copolymer was doped with iodine and determined to have conductivity of approximately 50 $(ohm-cm)^{-1}$.

The foregoing description of certain preferred embodiments of the block copolymer of the present invention, including the method of the making the same, have been presented for purposes of illustration and description. This description is not intended to be exhaustive or to limit the invention to the precise embodiments disclosed, and it will be recognized that various modifications and substitutions may be made without departing from the spirit of the invention. The described embodiments have been selected in order to best explain the principles of the invention and its practical application to thereby enable others skilled in the art to best utilize and practice the invention. Accordingly, it is intended that the scope of the invention be defined by the following claims.

What is claimed is:

1. An electrically conductive composition of matter comprising a block copolymer of polyisoprene having a molecular weight of between approximately 7,000 and 10,075, and polyacetylene having a molecular weight of approximately 1500 and 1910, said block copolymer being doped with iodine.

2. A method of making an electrically conductive block copolymer of polyisoprene having a molecular weight of between approximately 7,000 and 10,075, and polyacetylene having a molecular weight of between approximately 1500 and 1910 comprising:
   a. polymerizing monomeric isoprene in a solution containing n-butyllithium in toluene, thereby forming active polyisoprenyllithium in said solution:
   b. adding an amount of tetrabutoxytitanium which is substantially equimolar in amount to the amount of said polyisoprenyllithium, thereby forming an isoprenyl-butoxytitanium (III) catalyst in said solution;
   c. introducing gaseous acetylene into said solution to form by a spontaneous catalytic reaction a block copolymer of polyisoprene and polyacetylene;
   d. separating said block copolymer from solution; and
   e. doping said block copolymer with $I_2$ to render said copolymer electrically conductive.

3. The process defined in claim 2 wherein said block copolymer is doped by exposure to iodine vapor.

4. The process defined in claim 2 wherein said acetylene is polymerized onto said polyisoprene such that the polyacetylene polymer has a molecular weight of between approximately 1,600 and 1,900.

* * * * *